(12) United States Patent
Cribb

(10) Patent No.: US 12,509,545 B2
(45) Date of Patent: Dec. 30, 2025

(54) ANHYDRIDE CATALYSTS FOR URETHANE AND URETHANE-UREA SYSTEMS

(71) Applicant: Urethane Systems USA LLC, Perth Amboy, NJ (US)

(72) Inventor: Johnathon A. Cribb, Meriden, CT (US)

(73) Assignee: Urethane Systems USA LLC, Perth Amboy, NJ (US)

( * ) Notice: Subject to any disclaimer, the term of this patent is extended or adjusted under 35 U.S.C. 154(b) by 562 days.

(21) Appl. No.: 17/426,666

(22) PCT Filed: Feb. 3, 2020

(86) PCT No.: PCT/US2020/016320
§ 371 (c)(1),
(2) Date: Jul. 29, 2021

(87) PCT Pub. No.: WO2020/163195
PCT Pub. Date: Aug. 13, 2020

(65) Prior Publication Data
US 2022/0106429 A1   Apr. 7, 2022

Related U.S. Application Data

(60) Provisional application No. 62/802,971, filed on Feb. 8, 2019.

(51) Int. Cl.
| | |
|---|---|
| *C08G 18/16* | (2006.01) |
| *C08G 18/10* | (2006.01) |
| *C08G 18/42* | (2006.01) |
| *C08G 18/76* | (2006.01) |

(52) U.S. Cl.
CPC ........... *C08G 18/168* (2013.01); *C08G 18/10* (2013.01); *C08G 18/4238* (2013.01); *C08G 18/7621* (2013.01)

(58) Field of Classification Search
CPC .............................. C08G 18/10; C08G 18/168
See application file for complete search history.

(56) References Cited

U.S. PATENT DOCUMENTS

| | | | |
|---|---|---|---|
| 2,620,516 A | 12/1952 | Mueller | |
| 3,314,923 A | 4/1967 | Muller et al. | |
| 3,541,038 A | 11/1970 | Nakano et al. | |
| 3,592,789 A | 7/1971 | Bolton | |
| 3,708,458 A | 1/1973 | Alberino et al. | |
| 4,070,310 A | 1/1978 | Schneider et al. | |
| 4,080,318 A | 3/1978 | Smith et al. | |
| 4,089,822 A | 5/1978 | Vial | |
| 4,156,065 A | 5/1979 | Onder et al. | |
| 4,182,825 A * | 1/1980 | Jackle | C08G 18/10 528/68 |
| 4,268,426 A | 5/1981 | Williams et al. | |
| 4,404,258 A | 9/1983 | Loewrigkeit | |
| 4,430,454 A | 2/1984 | Castrantas et al. | |
| 4,784,201 A | 11/1988 | Palinkas | |
| 4,832,098 A | 5/1989 | Palinkas | |
| 4,880,847 A | 11/1989 | Credali et al. | |
| 4,921,029 A | 5/1990 | Palinkas | |
| 4,929,667 A * | 5/1990 | Ban | C08G 18/73 524/718 |
| 4,934,425 A | 6/1990 | Gajewski | |
| 5,605,657 A | 2/1997 | Nybakken | |
| 6,800,667 B1 * | 10/2004 | Kreyenschmidt | C08G 18/34 252/182.2 |
| 2002/0114955 A1 | 8/2002 | Lamers et al. | |
| 2003/0065124 A1 | 4/2003 | Rosenberg | |
| 2005/0261447 A1 | 11/2005 | Koshiro et al. | |
| 2016/0290091 A1 | 10/2016 | Takahashi et al. | |
| 2017/0152371 A1 | 6/2017 | Duan et al. | |
| 2019/0002667 A1 | 1/2019 | Kobayashi et al. | |
| 2022/0106429 A1 | 4/2022 | Cribb | |

FOREIGN PATENT DOCUMENTS

| | | | | |
|---|---|---|---|---|
| EP | 1491579 | A1 | 12/2004 | |
| RU | 2275400 | * | 9/2004 | ............... C08L 75/06 |

OTHER PUBLICATIONS

Ru-2275400_2004-09-11_English Translation.*
European Search Report from corresponding European Application No. 19160186, dated Jul. 25, 2019, two pages.
European Search Report from corresponding European Application No. 19150956.9, dated Jul. 22, 2019, 2 pages.
Restriction Requirement mailed May 10, 2024, in co-pending U.S. Appl. No. 17/428,294, 8 pages.
Office Action mailed Nov. 25, 2024, in co-pending U.S. Appl. No. 17/428,294, 28 pages.
Office Action mailed May 23, 2025, in co-pending U.S. Appl. No. 17/428,294, 14 pages.
Office Action mailed Sep. 17, 2025, in co-pending U.S. Appl. No. 17/428,294, 33 pages.

* cited by examiner

*Primary Examiner* — Michael L Leonard
(74) *Attorney, Agent, or Firm* — Oblon, McClelland, Maier & Neustadt, L.L.P.

(57) ABSTRACT

Polyurethane and polyurethane-urea compositions are prepared by amine cure under catalyzed reaction conditions. The curing reaction is performed with an acid anhydride based curing catalyst which is added to a prepolymer and then subsequently reacted with an amine based curative.

13 Claims, 2 Drawing Sheets

ANHYDRIDE CATALYSTS FOR URETHANE AND URETHANE-UREA SYSTEMS

BACKGROUND OF THE INVENTION

The present invention relates generally to polyurethanes and to the processes for making polyurethanes, and to mixtures for forming polyurethanes, including more particularly polyurethane and polyurethane-ureas made with use of latent-catalyst, for example acid anhydride compounds.

Polyurethanes are often obtained by reacting a polyurethane prepolymer and a chain extender. The polyurethane prepolymer is generally the product of a reaction between a polyol and a diisocyanate. The curing of the polyurethane prepolymer with a chain extender generally progresses in a mold with moderate heat to give a network structure to the polyurethanes.

It is desirable that polyurethane systems have various properties relating to processability. In casting polymers, for example, the time a prepolymer-curative mixture can be introduced into a mold before such mixture is setup, known as pot-life, must be sufficiently long so as to allow for introduction into the mold, but suitably short as well so as not to slow down production.

In casting processes using moldings an important processing condition to consider is the demolding time, i.e., the time needed to sufficiently cure a molded polyurethane article so as to allow for its undamaged removal from the mold. Shorter demolding times are improvements over standard approaches. As can be appreciated, shorter processing allows for more throughput.

To affect an increase in the speed of the overall curing process catalysts are often employed. Such catalysts for use with amine cured polyurethanes are generally acids, such as adipic acid, azealic acid and oxalic acid. Such acid catalysts tend to degrade prepolymers which reduces their usefulness in the curing process. The acid catalysts will require addition with the chain extender. Reducing the number of compounds that must be handled during the curing process (such as the handling of acid catalysts) is another desirable process consideration. Moreover, these catalysts influence the polyurethane elastomers mechanical properties and may produce erratic results.

A need has therefore been recognized in connection with providing a curative system in which the time needed to sufficiently cure a urethane or urethane-urea sufficiently so as to enable demolding for example is decreased without reducing the potlife of the reacting system nor sacrificing the mechanical and physical properties of the resulting polyurethane or polyurethane-urea.

It was surprisingly found that a latent catalyst, such as an anhydride, could be added to the isocyanate part of a polyurethane forming composition, for example a prepolymer, that would provide a catalytic effect during curing.

BRIEF SUMMARY OF THE INVENTION

There is broadly contemplated, in accordance with at least one presently preferred embodiment of the present invention, a polyurethane composition, comprising the reaction product of i) an diisocyanate, ii) a polyol, iii) a latent catalyst, iv) a chain extender, and v) optionally one or more additives and in another embodiment the diisocyanate and the polyol are reacted to form a prepolymer and the prepolymer is subsequently added with the latent catalyst to form a modified prepolymer and the modified prepolymer is reacted with the chain extender and optionally one or more of the additives. In one embodiment the latent catalyst is present in an amount of from 0.3 to 4 wt % based on the weight of the prepolymer where a modified prepolymer is formed or based on the amount of the diisocyanate and polyol components where no modified prepolymer is formed.

The latent catalyst of the present invention is an anhydride, such as acetic anhydride, propionic anhydride, isobutyric anhydride, hexanoic anhydride, and benzoic anhydride, maleic anhydride, hexahydrophthalic anhydride (HHPA), methylhexahydrophthalic anhydride (M-HHPA), phthalic anhydride, isatoic anhydride, pyromelitic anhydride, nonyl succinic anhydride, dodecyl succinic anhydride, polyazelaic anhydride or polysebacic anhydride.

In one embodiment, the latent catalyst comprises a non-cyclic linear anhydride comprising at least one of acetic anhydride, propionic anhydride, isobutyric anhydride, hexanoic anhydride, and benzoic anhydride.

In another embodiment, the latent catalyst comprises a cyclic anhydride, preferably maleic anhydride.

In a further embodiment of the present invention there is an article comprising the polyurethane comprising the reaction product of i) an diisocyanate, ii) a polyol, iii) a latent catalyst, iv) a chain extender, and v) optionally one or more additives and in another embodiment the diisocyanate and the polyol are reacted to form a prepolymer and the prepolymer is subsequently added with the latent catalyst to form a modified prepolymer and the modified prepolymer is reacted with the chain extender and optionally one or more of the additives.

In a further embodiment of the present invention there is a process for curing a polyurethane forming composition, comprising mixing a prepolymer and a latent catalyst thereby forming a modified prepolymer, mixing the modified prepolymer and a chain extender and optionally further additives, whereby a curative mixture is formed, and reacting the curative mixture, wherein the prepolymer is the reaction product of a diisocyanate and a polyol.

In another embodiment there is an article formed by the process for curing a polyurethane forming composition above.

For a better understanding of the present invention, together with other and further features and advantages thereof, reference is made to the following description, taken in conjunction with the accompanying drawings, and the scope of the invention will be pointed out in the appended claims. As used in this description and the appended claims, the singular forms "a," "an," and "the" include plural referents unless the content clearly dictates otherwise.

If not otherwise stated herein, it is to be assumed that all patents, patent applications, patent publications and other publications mentioned and cited herein are fully incorporated by reference.

DETAILED DESCRIPTION OF THE PREFERRED EMBODIMENTS

Figure 1:
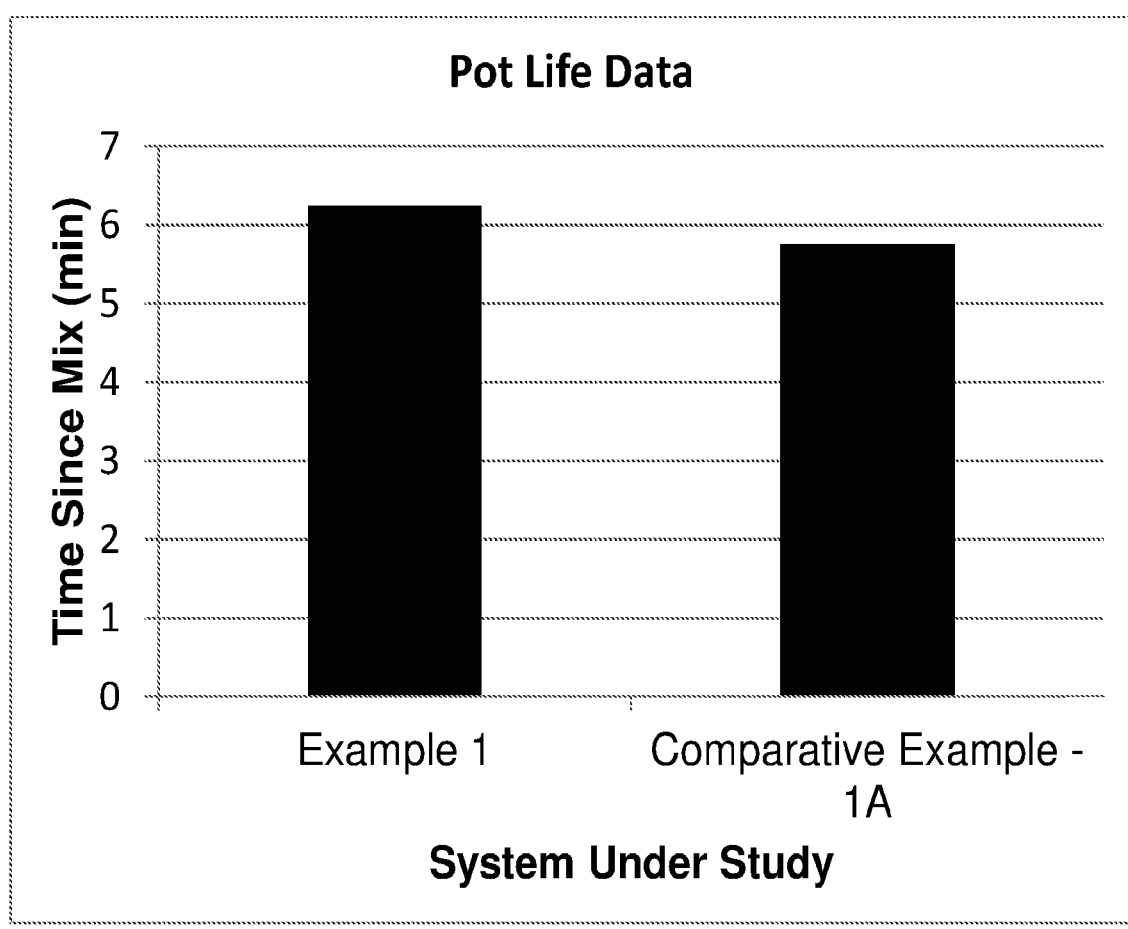
FIG. 1 graphically illustrates the pot life of examples 1 and 1A.

Polyurethanes compositions of the invention are formed by chemical reaction of an isocyanate component, such as diisocyanate, a hydroxyl group containing compound, such as diol or polyol, and a latent catalyst, such as acid anhydride, thereby forming repeating urethane groups and curing in presence of one or more amine chain extenders, and optionally additives. Often, ester, ether, urea, carbonate and aromatic rings are also present along with urethane linkages in the polyurethane polymer formed. Where (di)amines are used as chain extender to further extend the polyurethane chains formed of the reaction between isocyanate component and a isocyanate-reactive component, then a polyurethane-urea is formed. Unless clearly stated otherwise, as used throughout this application, polyurethane is to be understood to include polyurethane-ureas.

The polyurethanes of the invention can be formed into numerous useful articles by various means known such as coating, casting and milling processes.

In one embodiment of the invention, in the preparation of polyurethanes and polyurethane-ureas, diisocyanates are reacted with a long chain (high molecular weight) polyol to produce a prepolymer containing free isocyanate groups. This prepolymer may then be mixed with a latent catalyst to form a modified prepolymer. The modified prepolymer is chain extended (cured) with an diamine containing chain extender to form a polyurethane or polyurethane-urea composition. Curing of a liquid mixture of modified prepolymer and chain extender increases viscosity and hardness until finally a high molecular weight solid is formed. Curing of the modified polyurethane prepolymer with the chain extender imparts a network structure to the polyurethanes.

In one embodiment, there is a multi-step reaction (e.g., a two-step reaction) where a latent catalyst is mixed or reacted into a prepolymer with minimal impact on initial prepolymer properties and thereafter the prepolymer is cured. It is thought without wishing to be bound to any particular theory that the anhydride subsequently reacts with amine groups of the chain extender to generate an acid that catalyses the amine based cure reaction. Such a multi-step reaction allows for a delayed catalyzation process as compared to standard curing reactions utilizing acid based catalysts.

The basic reaction mechanisms can be represented as follows:

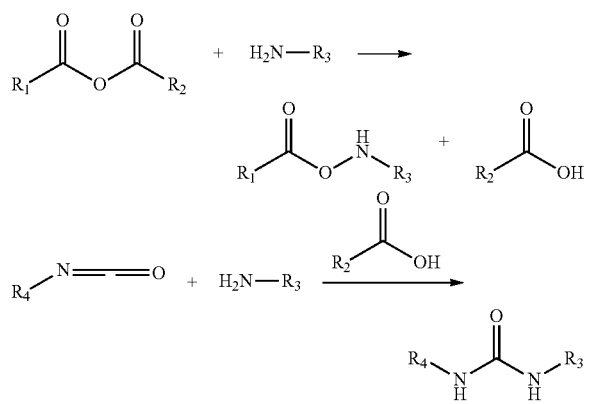

It is understood that the anhydride of the latent catalyst functions as a protective group for the parent carboxylic acid groups used to generate the anhydride; thus, the anhydride will not significantly react with the available isocyanate groups in the urethane prepolymer. Once an amine containing curative is mixed with the modified prepolymer including the anhydride based latent catalyst, the anhydride reacts with the available amine groups to generate an amide linkage and a carboxylic acid. The resulting carboxylic acid then catalyses the reaction between diisocyanate and amine.

Generally, the polyurethanes and the prepolymers of the invention are made using standard reaction processes and conditions as known in the art for the production of prepolymers and polyurethanes generally. Illustrative processes are described by way of example in U.S. Pat. Nos. 4,832,098, 4,934,425, 4,921,029, 4,784,201, and 5,605,657, and US2003/0065124. It should also be appreciated that in one embodiment, the polyurethanes according of the present invention can be made through a multi-step process such as that described above or via a one-shot casting process in which the isocyanate, polyol, chain extender and delayed-reaction catalyst are brought together simultaneously.

In one embodiment, a casting process may be utilized in which curing between the modified prepolymer and chain extender is performed in a mold. After curing, the polyurethane formed in the mold is demolded and postcured with additional heat and time so as to fully realize the physical properties of the polyurethane's elastomeric network structure.

As used herein, pot life is defined as the amount of time for a reactive mixture of prepolymer and chain extender to reach 20,000 centipoise (cP) as determined with a Brookfield Viscometer (Brookfield RV DV II viscometer or equivalent) at 100° C. As such the pot life provides a measure for the amount of time available after addition of curative to prepolymer during which the mixture can be poured, for example into a mold. The term is also commonly referred to as "working life" or "pour life". The pot life can be adjusted through the use of latent catalyst whereby the latent catalyst promotes the reaction between the chain extender and the modified prepolymer during curing.

The prepolymer of the invention is typically prepared using an excess of diisocyanate monomers resulting in a prepolymer mixture containing unreacted monomer or "free" diisocyanate. The amount of free diisocyanate may be reduced. Such low free monomer prepolymers and methods for their preparation are also known in the art, for example by way of distillation. Any distillation equipment that can be efficiently operated at deep vacuum, moderate temperature, and short residence time can be used in this step (see for example US2003/0065124). In an embodiment of the invention the prepolymer mixture may further comprise 0.01-10.0 wt %, in another embodiment 0.1-5.0 wt %, and in one embodiment less than 0.5 wt of free diisocyanate monomer, which is not reacted with the polyol.

There is no particular restriction on the prepolymer, or mixture of prepolymers, that can be used in the present invention, nor is there a particular restriction on the polyols or diisocyanate monomers that can be used in the preparation of the prepolymer.

In one embodiment, the latent catalyst comprises anhydride compounds such as non-cyclic linear anhydrides for example acetic anhydride, isobutyric anhydride, hexanoic anhydride, and benzoic anhydride.

The latent catalyst in one embodiment is present in an amount less than 5.0 wt %, in another embodiment, 0.3 to 4.0 wt %, and in another embodiment from 0.5 wt % to 2.0 wt %, based on the weight of prepolymer. However, it should again be noted that the specific amount of latent catalyst varies upon the degree of catalytic activity desired and the nature of the anhydride used.

The diisocyanate component for preparation of the prepolymer may include aromatic and aliphatic diisocyanate monomers. Aromatic diisocyanates are well known and are widely used in the preparation of polyurethanes and polyurethane-ureas.

Aromatic diisocyanate monomers useful in the practice of the present invention include 2,4'- and 4,4'-methylene-bis-(phenyl isocyanate) (MDI), 2,4'- and 2,6'-toluene diisocyanate (TDI), para-phenylene diisocyanate (PPDI), tolidene diisocyanate (TODD, naphthalene-1, 5-diisocyanate (ND), diphenyl-4,4'-diisocyanate, and mixtures thereof.

Aliphatic diisocyanate monomers include 1,6-hexane diisocyanate (HD), dibenzyl-4,4'-diisocyanate, isophorone diisocyanate (IPDI), 1,3'- and 1,4'-xylene diisocyanates, 1,6-hexamethylene diisocyanate, 1,3'- and 1,4'-cyclohexyl diisocyanate (CHDI), the three geometric isomers of 1,1'-methylene-bis(4-isocyanatocyclohexane) (H12MDI), and mixtures thereof.

In one embodiment, the diisocyanate monomers are aromatic diisocyanates, for example, TDI, MDI or a mixture of the two.

The polyol component optionally includes a polycaprolactone, a polyether, a polyester, a polycarbonate, or mixtures thereof. In various embodiments, the polyol may comprise one or more of a polyether, a polyester, a polycarbonate, or a polycaprolactone, preferably having a molecular weight ranging from 200 to 6000, e.g., from 400 to 3000 or from 1000 to 2500. In this context, molecular weight refers to the number average molecular weight in Daltons which as used herein is calculated via Hydroxyl number measurement by ASTM E222-94 method.

The polyols of the invention may include, for example, polyester of adipic acid, polyether of ethylene oxide, polyether of propylene oxide, polyether of tetrahydrofuran, polyether of 1,3-propanediol, polycaprolactone (PCL), polycarbonate, copolymers and terpolymers formed from the above, and mixtures thereof.

In various embodiments, the polyol may comprise glycols, triols, and/or higher average hydroxyl functionality and having molecular weights ranging, for example those including from 50 to 600, and in another embodiment from 55 to 300, and in another from 60 to 200. Such polyols may include in one embodiment lower molecular weight polyols. The average hydroxyl functionality can range from about 2 to 8, preferably about 2 to 3 and more preferably from about 2 to 2.5. Such glycols or triols may include, for example, ethylene glycol, isomers of propylene glycol, isomers of butane diol, isomers of pentanediol, isomers of hexanediol, trimethylolpropane, pentaerythritol, poly(tetramethylene ether) glycol, poly(trimethylene ether) glycol, diethylene glycol, triethylene glycol, dipropylene glycol, tripropylene glycol, and mixtures thereof.

In another embodiment of the invention the polyols useful for making prepolymer are compounds of the polyester polyol type. These polyols are prepared by conventional methods. Illustrative of the polyester polyols are poly(adipate) glycol, poly(hexamethylene adipate) glycol, poly(ethylene adipate) glycol (PEAG), poly(diethylene adipate) glycol, poly(ethylene/propylene adipate) glycol, poly(trimethylolpropane/hexamethylene adipate) glycol, poly(ethylene/butylene adipate) glycol, poly(butylene adipate) glycol, poly(hexamethylene/neopentyl adipate) glycol, poly(butylene/hexamethylene adipate) glycol (PBHAG), poly(neopentyl adipate) glycol, and mixtures, copolymers and terpolymers thereof.

In one embodiment there is use of PEAG polyol with an aromatic diiscyante such as; in one embodiment, TDI.

As used herein a chain extender (or curative) links multiple isocyanate prepolymer chains to form the resultant polyurethane elastomer. Broadly a chain extender is a material having two isocyanate-reactive groups per molecule. The chain extenders are amine based curative such as aromatic diamines. Numerous diamines are well known chain extenders for polyurethanes. In one embodiment the chain extenders are diamine chain extenders including for example 4,4'-methylene bis (o-chloroaniline) (MOCA), 4,4'-methylene-bis(2-chloroaniline) (MBCA); 4,4'-methylene-bis(3-chloro-2,6-diethylaniline (MCDEA); diethyl toluene diamine (DETDA); tertiary butyl toluene diamine (TBTDA); dimethylthio-toluene diamine; trimethylene glycol di-p-amino-benzoate; methylenedianiline (MDA); and methylenedianiline-sodium chloride complex.

In one embodiment the chain extender is 4,4'-methylene bis (o-chloroaniline) (MOCA).

For curing the modified prepolymers of the present invention with amine curatives, the number of —$NH_2$ groups in the diamine component should be approximately equal to the number of —NCO groups in the prepolymer. small variation is permissible but in general from about 80 to about 120% of the stoichiometric equivalent should be used, preferably about 85 to about 105%. The reactivity of isocyanate groups with amino groups varies according to the structure to which the groups are attached. As is well known, as for example in U.S. Pat. No. 2,620,516, some amines react very rapidly with some isocyanates while others react more slowly.

The curing temperature employed for curing the polyurethane forming composition can vary, but will typically be greater than 40° C., e.g., greater than 70° C. or greater than 90° C. In terms of ranges, the curing temperature optionally is from 20° C. to 160° C., e.g., from 90° C. to 150° C. or from 100° C. to 125° C.

Polyurethanes can be made by extending the chains of the prepolymers having in one embodiment low monomeric diisocyanate content with the above chain extenders by methods known in the art.

It may be desirable to vary the chemistry, chemical interactions, and reaction rates of the isocyanate, curative and/or latent catalyst to modulate the properties of the urethane network for a specific application. For example, the incorporation of free unreacted anhydride within the prepolymer allows for easier diffusion and mobility of the chemical species in the solid state that enable delayed catalytic pathways during curing. The skilled artisan may consider the impact that the anhydride chemical structure will have on solubility, steric effects and reaction kinetics.

Cast polyurethane products formed of the polyurethane and polyurethane-urea elastomers of the present invention are useful in various applications including for example roller skate wheels, printing and coating rolls, oil pipeline pigs, grain handling equipment, fork lift tires, hammers, sandblast curtains, laundry equipment, paper mill rolls, meat processing equipment.

Although the preferred embodiments of the present invention are described herein, it is to be understood that the invention is not limited to that precise embodiment, and that various other changes and modifications may be affected therein by one skilled in the art without departing from the scope or spirit of the invention. The following examples are illustrative of a practice of the invention, but are not meant to be considered as limiting the scope of the invention.

EXAMPLES

Methods—Conducting a Hardness Build Test

Once a prepolymer has been modified, the hardness build can be measured. The measure is related to the reaction rate between the isocyanate groups and curative groups in the reaction mixture, namely the hardness build is a measure of the later stages of the curing process. To run the hardness build test, 100 g of prepolymer is first weighed into a plastic container, intended for use in a vortex mixer (a 200 g sized cup from FlackTek was used in this study). The correct amount of chain extender is then weighed into a Teflon lined pan and placed on a hot plate to melt. While the curative is melting, the weighed amount of modified prepolymer is placed in a microwave oven and heated to a temperature of 90° C. Once the melting of the curative and heating of prepolymer are complete, the curative is poured into the plastic container, the container is sealed, placed into a vortex mixer, and mixed for 30 s at a speed of 2500 RPM. When the mixer is started, a stop watch is started; this defines the beginning of the hardness build test.

Once the mixer stops, the reaction mixer is then poured into a small circular metal tin, measuring 3" in diameter and ½" deep that is placed in an oven set to 100° C. The residual mixture in then poured into a small puddle on the floor of the oven, measuring approximately 3" in diameter. At this time, a metal or wooden spatula is continuously passed through the puddle on the floor of the oven, and the flow and extensional behavior of the reacting material is continuously observed. Once the material mounds on top of the puddle and does not flow back into the body of the material, when removing the spatula from the puddle, the gel point has been reached, and the value is recorded.

After the gel point has been reached, the material is left to harden in the oven, until it is of sufficient hardness to register on a Shore A hardness gauge (typically 4-8 minutes in this study). The hardness of the material in the circular tin is then measured and recorded every two minutes, until the material either reaches a hardness of 70 A or 20 minutes has elapsed. The hardness measurements are made at a distance between ¼" to ½" from the wall of the circular tin. The data are then plotted in a scatter plot with time on the ordinate and Shore A hardness on the abscissa to produce a hardness build curve.

Example 1

Figure 2:
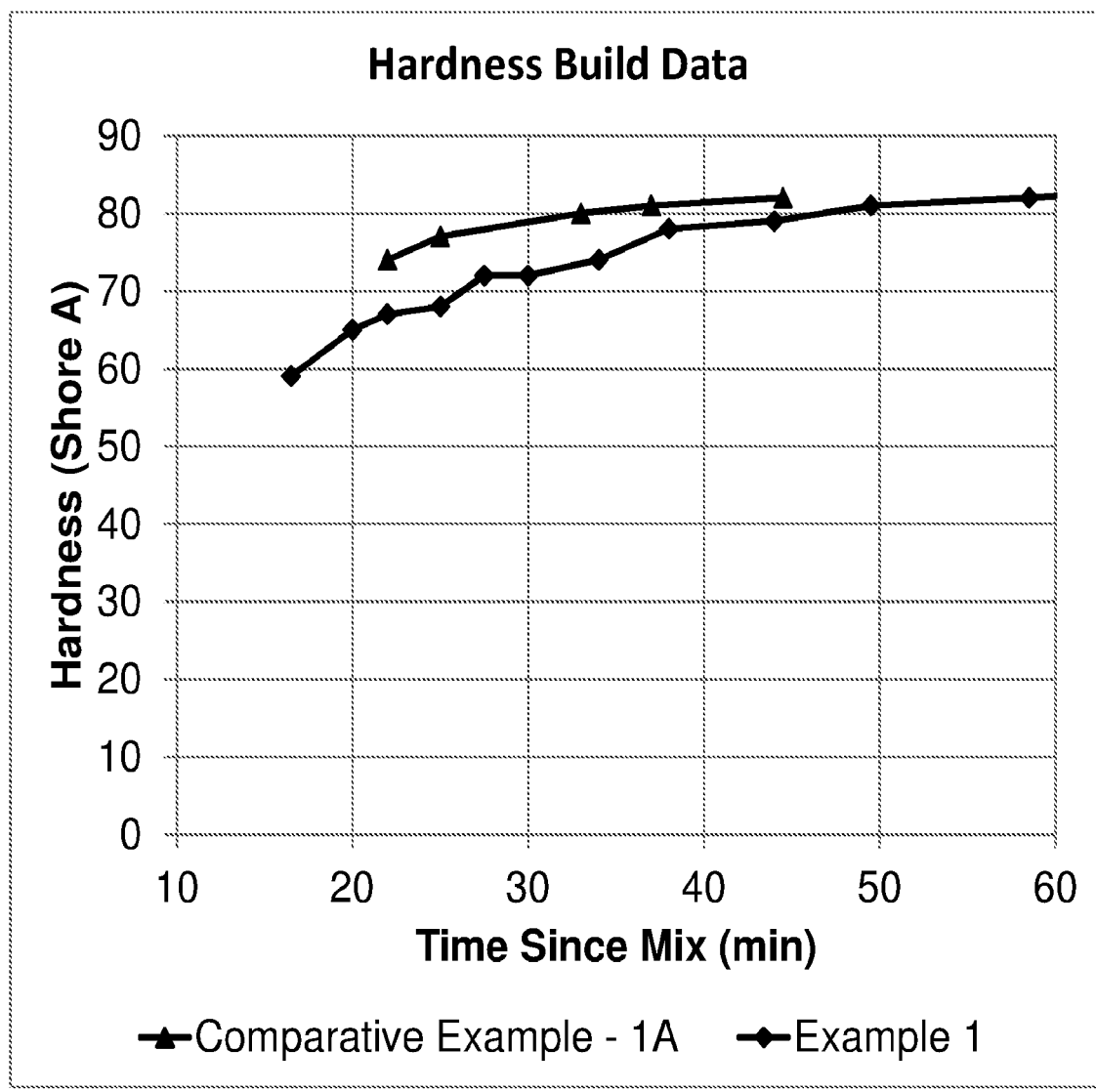
FIG. 2 graphically illustrates the hardness build of examples 1 and 1A.

A polyurethane composition was prepared from a TDI terminated polyester prepolymer and methylenebis(2-chloroaniline) (MOCA). A low-free TDI terminated polyester prepolymer based on poly(ethylene adipate) glycol having an NCO content of 3.7 weight percent (100 grams) was heated to 70° C. and mixed with MOCA which had been melted at approximately 125° C., until a uniform mixture was obtained. The molar ratio of curative to isocyanate was 95% of the theoretical stoichiometric amount. A pot life and hardness build test was then conducted on the reacting mixture; the results of which are charted in FIGS. 1 and 2; respectively.

Comparative Example 1A

A polyurethane composition was prepared from a modified TDI terminated polyester prepolymer and MOCA. The prepolymer from example 1 was modified by first heating the prepolymer to a temperature of 70° C. and then mixing in 0.2 wt % acetic anhydride. The resulting modified prepolymer was then mixed with MOCA as in Example 1. A pot life and hardness build test were conducted on the reacting mixture; the results of which are charted in FIGS. 1 and 2, respectively.

What is claimed is:

1. A polyurethane forming composition, comprising the reaction product of:
   i) a diisocyanate,
   ii) a polyol,
   iii) a latent catalyst,
   iv) a chain extender, and
   v) optionally one or more additives,
   wherein
   the diisocyanate and the polyol are reacted to form a prepolymer and the prepolymer is subsequently added with the latent catalyst to form a modified prepolymer and the modified prepolymer is reacted with the chain extender and optionally one or more of the additives,
   the prepolymer contains less than 0.5% by weight of unreacted diisocyanate monomer,
   the latent catalyst is at least one of maleic anhydride, acetic anhydride, propionic anhydride, isobutyric anhydride, hexanoic anhydride, and benzoic anhydride,
   the polyol is at least one of poly(adipate) glycol, poly (hexamethyleneadipate) glycol, poly(ethylene adipate) glycol (PEAG), poly(diethylene adipate) glycol, poly (ethylene/propylene adipate) glycol, poly(trimethylolpropane/hexamethylene adipate) glycol, poly(ethylene/butylene adipate) glycol, poly(butylene adipate) glycol, poly(hexamethylene/neopentyl adipate) glycol, poly (butylene/hexamethylene adipate) glycol (PBHAG), poly(neopentyl adipate) glycol, and mixtures, copolymers and terpolymers thereof, and
   the chain extender is at least one of 4,4'-methylene-bis (2-chloroaniline) (MOCA); 4,4,'-methylene-bis(3-chloro-2,6-diethylaniline); diethyl toluene diamine; t-butyl toluene diamine; dimethylthiotoluene diamine; trimethylene glycol di-p-amino-benzoate; methylene-dianiline; methylenedianiline-sodium chloride complex; and mixtures thereof.

2. The polyurethane forming composition according to claim 1, wherein the latent catalyst is present in an amount of from 0.5 to 2 wt % based on the weight of the prepolymer.

3. An article comprising the polyurethane forming composition according to claim 1.

4. A process for curing a polyurethane forming composition, comprising:
   mixing a prepolymer and a latent catalyst, wherein the latent catalyst comprises an anhydride, thereby forming a modified prepolymer,
   mixing the modified prepolymer and a chain extender and optionally further additives, whereby a curative mixture is formed, and
   reacting the curative mixture,
   wherein
   the prepolymer is the reaction product of a diisocyanate and a polyol,
   the prepolymer contains less than 0.5% by weight of unreacted diisocyanate monomer,
   the latent catalyst is at least one of maleic anhydride, acetic anhydride, propionic anhydride, isobutyric anhydride, hexanoic anhydride, and benzoic anhydride,
   the polyol is at least one of poly(adipate) glycol, poly (hexamethyleneadipate) glycol, poly(ethylene adipate) glycol (PEAG), poly(diethylene adipate) glycol, poly (ethylene/propylene adipate) glycol, poly(trimethylolpropane/hexamethylene adipate) glycol, poly(ethylene/ butylene adipate) glycol, poly(butylene adipate) glycol, poly(hexamethylene/neopentyl adipate) glycol, poly(butylene/hexamethylene adipate) glycol (PBHAG), poly(neopentyl adipate) glycol, and mixtures, copolymers and terpolymers thereof, and the chain extender is at least one of 4,4'-methylene-bis(2-chloroaniline) (MOCA); 4,4,'-methylene-bis(3-chloro-2,6-diethylaniline); diethyl toluene diamine; t-butyl toluene diamine; dimethylthiotoluene diamine; trimethylene glycol di-p-amino-benzoate; methylenedianiline; methylenedianiline-sodium chloride complex; and mixtures thereof.

5. The process of claim 4, wherein the prepolymer comprises the reaction product of toluene diisocyanate (TDI) and at least one polyester polyol, comprising poly(ethylene adipate) glycol (PEAG) and the chain extender comprises 4,4'-methylene bis (o-chloroaniline) (MOCA).

6. The polyurethane forming composition according to claim 1, wherein the polyurethane forming composition have a pot life between 5 min to 7 min.

7. The polyurethane forming composition according to claim 1, wherein the polyurethane forming composition reaches a hardness of 80 A at 100° C. in 45 min after a gel point.

8. The polyurethane forming composition according to claim 1, wherein the diisocyanate is toluene diisocyanate (TDI).

9. The polyurethane forming composition according to claim 1, wherein the polyol is poly(ethylene adipate) glycol (PEAG).

10. The polyurethane forming composition according to claim 1, wherein the chain extender is 4,4'-methylene-bis(2-chloroaniline) (MOCA).

11. The polyurethane forming composition according to claim 1, wherein the latent catalyst is acetic anhydride.

12. The polyurethane forming composition according to claim 1, wherein
the diisocyanate is toluene diisocyanate (TDI),
the polyol is poly(ethylene adipate) glycol (PEAG),
the chain extender is 4,4'-methylene-bis(2-chloroaniline) (MOCA), and
the latent catalyst is acetic anhydride.

13. The polyurethane forming composition according to claim 2, wherein
the diisocyanate is toluene diisocyanate (TDI),
the polyol is poly(ethylene adipate) glycol (PEAG),
the chain extender is 4,4'-methylene-bis(2-chloroaniline) (MOCA), and
the latent catalyst is acetic anhydride.

* * * * *